(12) United States Patent
Murai (10) Patent No.: US 10,866,416 B2
(45) Date of Patent: Dec. 15, 2020

(54) DISPLAY CONTROL DEVICE AND DISPLAY CONTROL METHOD (71) Applicant: Toyota Jidosha Kabushiki Kaisha, Toyota (JP)

(72) Inventor: Rie Murai, Chiba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/221,805

(22) Filed: Dec. 17, 2018

(65) Prior Publication Data
US 2019/0204598 A1 Jul. 4, 2019

(30) Foreign Application Priority Data
Dec. 28, 2017 (JP) .................................. 2017-253279

(51) Int. Cl.
G02B 27/01 (2006.01)
G08G 1/16 (2006.01)
B60K 35/00 (2006.01)
B60R 1/00 (2006.01)

(52) U.S. Cl.
CPC .......... *G02B 27/0101* (2013.01); *B60K 35/00* (2013.01); *B60R 1/00* (2013.01); *G08G 1/166* (2013.01); *B60K 2370/334* (2019.05); *B60R 2300/205* (2013.01); *B60R 2300/308* (2013.01); *G02B 2027/014* (2013.01)

(58) Field of Classification Search
None
See application file for complete search history.

(56) References Cited

U.S. PATENT DOCUMENTS

| 2012/0314074 | A1* | 12/2012 | Aimura | G06K 9/00362 348/148 |
| 2014/0236483 | A1* | 8/2014 | Beaurepaire | G08G 1/168 701/533 |
| 2015/0243171 | A1* | 8/2015 | Emura | G06K 9/00805 340/435 |
| 2018/0330619 | A1* | 11/2018 | Shimizu | G08G 1/166 |
| 2019/0071014 | A1* | 3/2019 | Misu | G06K 9/00805 |

FOREIGN PATENT DOCUMENTS

JP 2009009446 A 1/2009

* cited by examiner

Primary Examiner — Joseph R Haley
(74) Attorney, Agent, or Firm — Dinsmore & Shohl LLP (57) ABSTRACT A display control device configured to control a head-up display that projects an image onto an area ahead of a driver to display the image such that the image that is a virtual image is superimposed on an actual view. The display control device includes a controller. The controller is configured to execute control such that a highlighting image that highlights a specific object present ahead of a vehicle is displayed when a warning against the specific object is given to the driver. The specific object is detected based on traveling situation information regarding a traveling situation of the vehicle. The traveling situation information based on an output from a vehicular sensor including an on-board camera.

7 Claims, 2 Drawing Sheets

DISPLAY CONTROL DEVICE AND DISPLAY CONTROL METHOD

CROSS-REFERENCE TO RELATED APPLICATIONS

This application claims priority to Japanese Patent Application No. 2017-253279 filed on Dec. 28, 2017, which is incorporated herein by reference in its entirety including the specification, drawings and abstract.

BACKGROUND

1. Technical Field

The disclosure relates to a display control device configured to control display of various kinds of information, and relates also to a display control method of controlling display of various kinds of information.

2. Description of Related Art

Japanese Unexamined Patent Application Publication No. 2009-009446 (JP 2009-009446 A) describes a vehicular display device. According to JP 2009-009446 A, when there is an object that may obstruct traveling of a host vehicle, the vehicular display device causes a head-up display to project a character, which informs a driver of the presence of the object, onto a windshield of the host vehicle.

SUMMARY

According to the technique described in JP 2009-009446 A, a character is used to inform a driver of the presence of an object. The driver visually recognizes the character, and then transfers the driver's gaze to the object, thereby recognizing the object. Hence, it may take some time for the driver to recognize the object.

The disclosure provides a technique that enables a driver to quickly recognize specific object.

A first aspect of the disclosure relates to a display control devise. The display control device is configured to control a head-up display that projects an image onto an area ahead of a driver to display the image such that the image that is a virtual image is superimposed on an actual view. The display control device includes a controller configured to execute control such that a highlighting image that highlights a specific object present ahead of a vehicle is displayed when a warning against the specific object is given to the driver. The specific object is detected based on traveling situation information regarding a traveling situation of the vehicle. The traveling situation information is based on an output from a vehicular sensor including an on-board camera.

According to the first aspect of the disclosure, when an emergent situation for traveling of the vehicle has occurred, the highlighting image that highlights the specific object in the actual view is displayed. Thus, it is possible to enable the driver to quickly recognize the presence of the specific object.

In the first aspect of the disclosure, the controller may be configured to execute control such that the highlighting image is displayed so as to be superimposed on the specific object or is displayed in a vicinity of the specific object. In the first aspect of the disclosure, the controller may be configured to execute control such that the highlighting image is displayed at a position shifted from the specific object in a traveling direction of the specific object. In the first aspect of the disclosure, the controller may be configured to execute control such that the highlighting image having a shape corresponding to the specific object is displayed.

In the first aspect of the disclosure, the controller may be configured to derive a level of emergency based on the traveling situation information and to vary the highlighting image depending on the level of emergency. In the first aspect of the disclosure, the controller may be configured to execute control such that the highlighting image that makes the specific object more conspicuous is displayed as the level of emergency is higher.

In the first aspect of the disclosure, the controller may be configured to execute control such that the highlighting image is displayed only when an emergent situation for traveling of the vehicle has occurred.

A second aspect of the disclosure relates to a display control method of controlling a head-up display that projects an image onto an area ahead of a driver to display the image such that the image that is a trial image is superimposed on an actual view. The display control method includes: acquiring traveling situation information regarding a traveling situation of a vehicle based on an output from a vehicular sensor including an on-board camera; and displaying a highlighting image which highlights a specific object that is present ahead of the vehicle and that is detected based on the traveling situation information, when a warning against the specific object is given to the driver.

According to the second aspect of the disclosure, when an emergent situation for traveling of the vehicle has occurred, the highlighting image that highlights the specific object in the actual view is displayed. Thus, it is possible to enable the driver to quickly recognize the presence of the specific object.

According to the foregoing aspects of the disclosure, it is possible to provide a technique that enables a driver to quickly recognize a specific object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1B is a diagram illustrating the actual view ahead of the host vehicle, which is visually recognized by the driver, and a highlighting image that is displayed so as to be superimposed on the actual view and that is varied depending on the level of emergency.

DETAILED DESCRIPTION OF EMBODIMENTS

Figure 1:
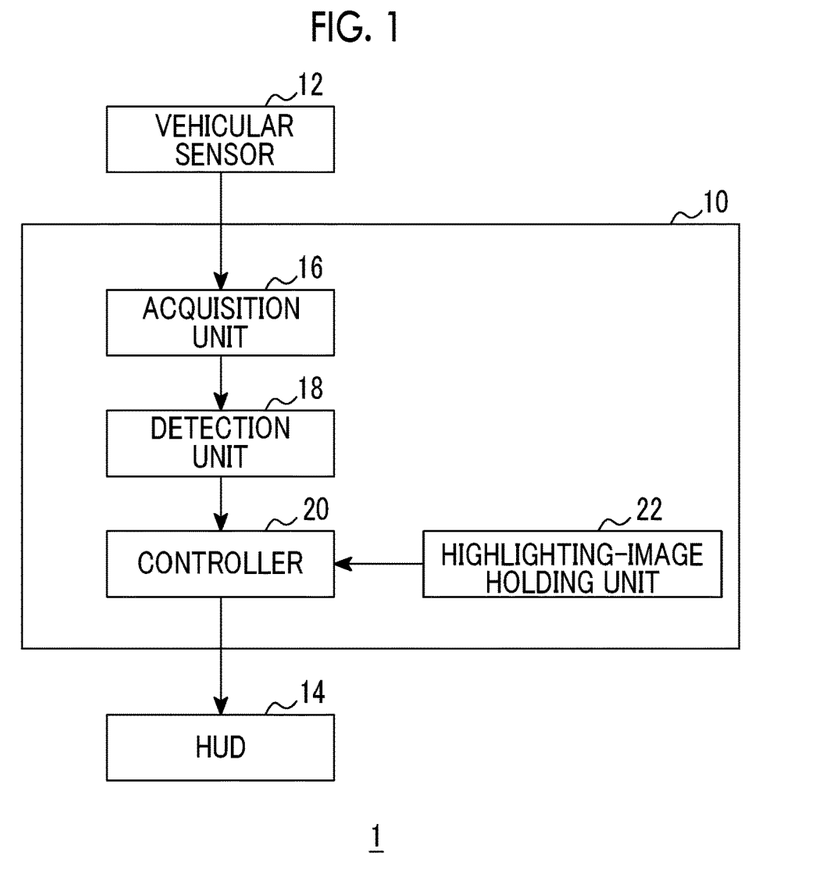
FIG. 1 is a diagram illustrating the functional configuration of a display system according to an embodiment.

FIG. 1 is a diagram illustrating the functional configuration of a display system 1 according to an embodiment. The display system 1 includes a display control device 10, a vehicular sensor 12, and a head-up display (hereinafter, abbreviated as "HUD") 14. The display system 1 controls display by the 14 as follows: when a specific object against which a warning should be issued is detected ahead of a host vehicle while the host vehicle is traveling, the specific object is highlighted to enable a driver to quickly recognize the specific object.

In the display control device 10 illustrated in FIG. 1, several elements are indicated as functional blocks configured to execute various kinds of processing. Each of the elements may be composed of a circuit block, a memory, or a large-scale integration circuit (LSI) in terms of hardware, and may be implemented by, for example, a program loaded in a memory in terms of software. Therefore, persons skilled in the art understand that the functional blocks may be implemented in various modes, that is, the functional blocks may be implemented only by hardware, may be implemented only by software, or may be implemented by a combination of hardware and software. Namely, the mode of implementation of the functional blocks is not limited to any particular mode.

The vehicular sensor 12 is, for example, a sensor that detects a situation outside the host vehicle. The vehicular sensor 12 includes at least an on-board camera that captures an image of a region ahead of the host vehicle. The vehicular sensor 12 further includes, for example, a millimeter-wave radar, an acoustic wave sensor, and an infrared laser. Specific objects, such as a wall, a building, a signboard, another vehicle, and a person, that are present ahead of the host vehicle can be detected based on a result of detection by the vehicular sensor 12.

The vehicular sensor 12 may include a sensor that detects a traveling state of the host vehicle, such as a vehicle-speed detection sensor or a steering-amount detection sensor. The vehicular sensor 12 detects information based on which traveling of the host vehicle can be predicted.

The HUD 14 projects an image onto an area ahead of the driver to display the image such that the image that is a virtual image is superimposed on an actual view. Specifically, the HUD 14 is mounted in a vehicle cabin of the host vehicle, and the HUD 14 projects images indicating various kinds of information onto a windshield (an example of "area ahead of the driver") of the host vehicle based on control signals output from the display control device 10. Each of the images is a virtual image. The virtual image projected onto the windshield is not formed on the windshield. The driver feels as if the virtual image is displayed outside the host vehicle. Thus, the display by the HUD 14 is provided with an appearance of depth. Thus, the virtual image is displayed so as to be superimposed on the actual image of the region ahead of the host vehicle. For this reason, the driver can obtain information indicated by the virtual image with almost no need to shift the driver's gaze while the host vehicle is traveling.

The display control device 10 outputs a control signal to the HUD 14 to control the HUD 14 such that an image is displayed so as to be superimposed on a specific object present ahead of the host vehicle. The display control device 10 includes an acquisition unit 16, a detection unit 18, a controller 20, and a highlighting-image holding unit 22.

The acquisition unit 16 acquires traveling situation information regarding a traveling situation of the host vehicle, based on an output from the vehicular sensor 12. The traveling situation information includes a captured image of a region ahead of the host vehicle and results of detection by, for example, the millimeter-wave radar and the acoustic wave sensor.

The detection unit 18 detects a specific object present ahead of the host vehicle based on the traveling situation information, and the detection unit 18 detects (determines) whether an emergent situation for traveling of the host vehicle has been caused by the specific object. Whether a warning against the presence of the specific object should be given to the driver can be determined based on the result of detection by the detection unit 18. The detection unit 18 analyzes the captured image of the region ahead of the host vehicle, extracts a specific object, such as a wall, a building, a traffic sign, another vehicle, or a person, which is present ahead of the host vehicle, and acquires information indicating the position of the specific object and the kind of the specific object. The positional information regarding the specific object includes two-dimensional positional information on the captured image and information indicating the distance between the specific object and the host vehicle. The detection unit 18 may acquire information indicating the distance between the specific object and the host vehicle and the bearings (i.e., relative position) of the specific object with respect to the host vehicle, based on the results of detection by, for example, the millimeter-wave radar and the acoustic wave sensor. Note that, at least one of processing of extracting a specific object from the captured image and processing of detecting a specific object based on the result of the detection by, for example, the millimeter-wave radar and the acoustic wave sensor may be executed by the vehicular sensor 12 instead of the display control device 10. In either case, the detection unit 18 acquires information regarding the specific object present ahead of the host vehicle, such as the positional information regarding the specific object.

The detection unit 18 tracks the detected specific object to detect a traveling direction of the specific object. The detection unit 18 detects the traveling direction of the specific object, based on a change in the position of the specific object. The detection unit 18 detects which of the rightward direction of the host vehicle and the leftward direction of the host vehicle is the traveling direction of the specific object, or detects whether the specific object is traveling toward a center line of the traveling direction of the host vehicle. When the specific object is traveling toward the center line of the traveling direction of the host vehicle, the specific object may obstruct traveling of the host vehicle. The center line of the traveling direction of the host vehicle is a line that is set so as to pass through the center of the host vehicle, and that extends in the front-rear direction of the host vehicle.

The detection unit 18 detects whether an emergent situation for traveling of the host vehicle has been caused by the detected specific object. Examples of an emergent situation for traveling of the host vehicle include a situation where the specific object is highly likely to obstruct traveling of the host vehicle, a situation where the driver of the host vehicle is highly likely to violate traffic regulations, and a situation where the driver of the host vehicle is violating traffic regulations.

The detection unit 18 detects whether the specific object is highly likely to obstruct traveling of the host vehicle and an emergent situation for traveling of the host vehicle has occurred, based on the positional information regarding the relative position between the specific object and the host vehicle. The detection unit 18 detects whether an emergent situation for traveling of the host vehicle has occurred, based on the distance between the specific object and the center line extending in the traveling direction of the host vehicle, the distance between the specific object and the host vehicle, and the traveling direction of the specific object. For example, when the specific object is traveling toward the center line extending in the traveling direction of the host vehicle and the distance between the specific object and the host vehicle is equal to or shorter than five meters, the detection unit 18 detects a fact that an emergent situation for traveling of the host vehicle has occurred. The detection unit 18 detects whether an emergent situation for traveling of the host vehicle has occurred, based on the relative speed between the specific object and the host vehicle in addition to the positional information regarding the relative position between the specific object and the host vehicle.

The detection unit 18 detects whether the driver of the host vehicle is highly likely to violate traffic regulations or is violating traffic regulations and an emergent situation for traveling of the host vehicle has occurred, based on the information acquired from the specific object. The detection unit 18 acquires, for example, information indicated by traffic signs, such as a traffic sign indicating right turn prohibition, a traffic sign indicating no-entry, and a traffic sign indicating a speed limit, from the captured image. The detection unit 18 then detects whether an emergent situation for traveling of the host vehicle has occurred, based on the information indicated by the traffic signs and the traveling situation of the host vehicle. When the detection unit 18 detects a fact that an emergent situation for traveling of the host vehicle has occurred, the detection unit 18 sends, to the controller 20, information regarding the specific object against which a warning should be issued.

When an emergent situation for traveling of the host vehicle has been caused by the specific object present ahead of the host vehicle, that is, when a warning against the presence of the specific object is given to the driver, the controller 20 executes control of displaying a highlighting image for highlighting the specific object present in the actual view of the region ahead of the host vehicle such that the highlighting image is superimposed on the specific object or the highlighting image is displayed in the vicinity of the specific object. When the controller 20 receives, from the detection unit 18, the information regarding the specific object against which a warning should be issued, the controller 20 causes the HUD 14 to project the highlighting image onto the windshield of the host vehicle to display the highlighting image such that the highlighting image is superimposed on the specific object in the actual view or the highlighting image is displayed in the vicinity of the specific object in the actual view. On the other hand, when the detection unit 18 does not detect occurrence of an emergent situation for traveling of the host vehicle, no highlighting image is displayed. The vicinity of the specific object means a location that is near the specific object and that is not overlapped with the specific object, and means such a location that, when the driver visually recognizes the highlighting image, the driver also visually recognizes the specific object.

The controller 20 causes the highlighting image to be displayed so as to be superimposed on the specific object which is present ahead of the host vehicle and against which a warning should be issued or causes the highlighting image to be displayed in the vicinity of the specific object. In this way, the specific object in the actual view is highlighted, whereby the driver is enabled to recognize the specific object. When the driver visually recognizes the highlighting image that seems to be in the actual view, the driver can quickly recognize the specific object on which the highlighting image is superimposed or which is in the vicinity of the highlighting image. The highlighting image is projected onto the windshield of the host vehicle only when an emergent situation for traveling of the host vehicle has occurred. In this way, it is possible to effectively give a warning to the driver.

The highlighting-image holding unit 22 holds highlighting images, such as an image of a frame for surrounding the specific object, an image having a shape of an automobile, an image having a shape of a bicycle, an image having a shape of a person, and an image of text for giving a warning.

When the specific object is an immovable feature, the controller 20 may cause a framer surrounding the feature to be displayed as a highlighting, image for highlighting the feature. When the specific object is a moving object, such as a person or another vehicle, the controller 20 may cause a highlighting image having a shape corresponding to the moving object to be displayed. That is, the controller 20 may vary the kind of a highlighting image depending on the kind of a specific object.

Figure 2:
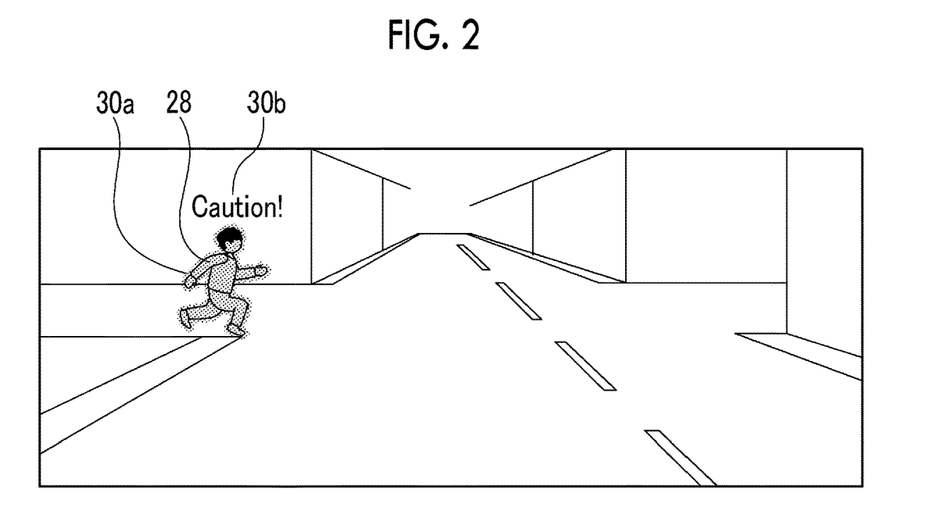
FIG. 2 is a diagram illustrating an actual view ahead of a host vehicle, which is visually recognized by a driver, and a highlighting image that is displayed so as to be superimposed on the actual view.

FIG. 2 illustrates an actual view ahead of the host vehicle, which is visually recognized by the driver, and a highlighting image that is displayed so as to be superimposed on the actual view. FIG. 2 illustrates a situation where a pedestrian 28, which is a specific object, is about to run out in front of the host vehicle.

The detection unit 18 detects the pedestrian 28 based on a detection result output from the vehicular sensor 12, acquires a relative position between the pedestrian 28 and the host vehicle and a traveling direction of the pedestrian 28, and determines whether an emergent situation for traveling of the host vehicle has occurred. When the detection unit 18 determines that an emergent situation for traveling of the host vehicle has been caused by the pedestrian 28 and the controller 20 receives, from the detection unit 18, the information regarding the pedestrian 28 against which a warning should be issued, the controller 20 causes the HUD 14 to project a first highlighting image 30*a* for highlighting the pedestrian 28 and a second highlighting image 30*b* onto the windshield of the host vehicle. The driver recognizes the pedestrian 28 at the same time that the driver visually recognizes the first highlighting image 30*a* and the second highlighting image 30*b*. This enables the driver to take measures, such as reduction of a vehicle speed.

The first highlighting image 30*a* is displayed so as to be superimposed on the pedestrian 28 and the vicinity of the pedestrian 28. The first highlighting image 30*a* is translucent. The second highlighting image 30*b* is displayed, in text form, in the vicinity of the top of the pedestrian 28. The first highlighting image 30*a* is displayed in a shape corresponding to the shape of the pedestrian 28, whereby the driver easily recognizes that the specific object against which a warning should be issued is the pedestrian 28. When the specific object against which a warning should be issued is a bicycle or an automobile, a highlighting image may be displayed in a shape corresponding to the shape of the bicycle or the shape of the automobile.

Figure 3A:
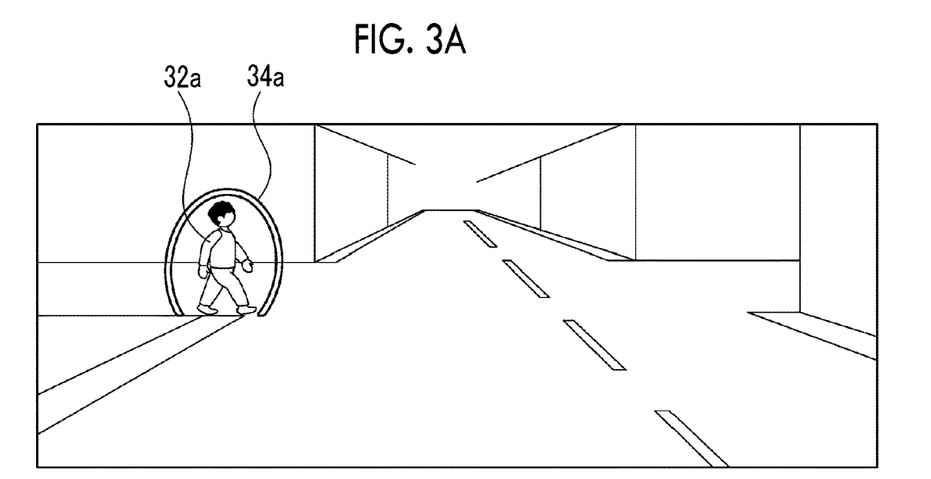
FIG. 3A is a diagram illustrating the actual view ahead of the host vehicle, which is visually recognized by the driver, and a highlighting image that is displayed so as to be superimposed on the actual view and that is varied depending on the level of emergency.
Figure 3B:
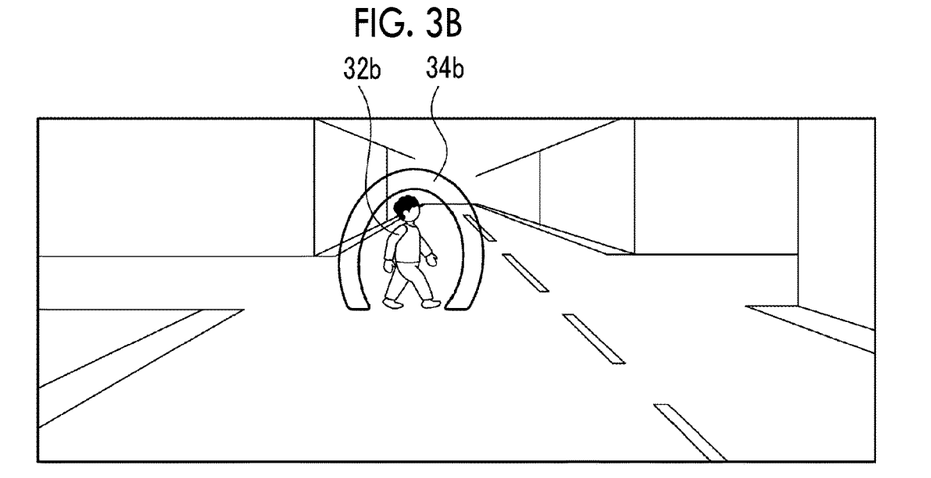

FIG. 3A and FIG. 3B are diagrams each illustrating the actual view ahead of the host vehicle, which is visually recognized by the driver, and a highlighting image that is displayed so as to be superimposed on the actual view and that is varied depending on the level of emergency. The level of emergency against a pedestrian 32*b* illustrated in FIG. 3B is higher than the level of emergency against the pedestrian 32*a* illustrated in FIG. 3A.

The controller 20 derives a level of emergency based on the traveling situation information, and varies the highlighting image depending on the level of emergency. The controller 20, for example, calculates a level of emergency based on the distance between the host vehicle and the specific object, the traveling direction of the specific object, and the distance from the specific object to the center line extending in the traveling direction of the host vehicle. The level of emergency is calculated to be higher as the possibility of collision between the host vehicle and the specific object is higher. Further, the controller 20 calculates the level of emergency based on the information indicated by a traffic sign. When the driver of the host vehicle is violating traffic regulations, the level of emergency is calculated to be higher than that when the driver of the host vehicle is not violating traffic regulations.

In FIG. 3A, the pedestrian 32a is present ahead of the host vehicle but the pedestrian 32a is at a location that is hardly overlapped with a path on which the host vehicle is predicted to travel. In FIG. 3B, the pedestrian 32b is at a location closer to the center line extending in the traveling direction of the host vehicle than the pedestrian 32a is (i.e., the distance from the pedestrian 32b to the center line is shorter than the distance from the pedestrian 32a to the center line). For this reason, the level of emergency against the pedestrian 32b illustrated in FIG. 3B is higher than the level of emergency against the pedestrian 32a illustrated in FIG. 3A.

Both a third highlighting image 34a illustrated in FIG. 3A and a fourth highlighting image 34b illustrated in FIG. 3B have such a shape as to surround a pedestrian. However, the fourth highlighting image 34b is larger than the third highlighting image 34a, and the fourth highlighting image 34b is displayed such that the pedestrian 32b is highlighted conspicuously. That is, the controller 20 executes control of displaying a highlighting image for making the specific object more conspicuous as the level of emergency is higher. Thus, the driver can more easily recognize the specific object as the level of emergency is higher. The highlighting image is displayed to be larger as the level of emergency is higher. In this way, the driver is made to feel that the present nearby, and the highlighting image provided with an appearance of depth is displayed.

FIG. 3A and FIG. 38 illustrate a control mode in which the controller 20 causes the highlighting image m be displayed to be larger as the level of emergency is higher. However, the control mode is not limited to this. The controller 20 may, for example, vary the pixel value of the highlighting image depending on the level of emergency such that the color of the highlighting image is changed from blue to red as the level of emergency is higher.

The controller 20 may vary the brightness of the highlighting image depending on the level of emergency such that the highlighting image is made darker as the level of emergency is higher. The controller 20 causes a translucent highlighting image to be displayed so as to be superimposed on the specific object rind makes the specific object darker than the actual view, thereby making the driver feel that the specific object is present nearby.

The controller 20 may vary the height at which the highlighting image is located, depending on the level of emergency, such that the height at which the highlighting image is located is made lower as the level of emergency is higher. The height at which the highlighting image is located may be a height in the vertical direction of the windshield onto which the highlighting image is projected by the HUD 14 or a height in the vertical direction in the actual view that is visually recognized by the driver. The controller 20 causes the highlighting image id be superimposed on the specific object and causes the highlighting image to be shifted to a position lower them the specific object. In this way it is possible to make the driver feel that the specific object is present nearby.

The controller 20 may apply blurring to the highlighting image based on the level of emergency. The highlighting image may be displayed more clearly as the level of emergency is higher. Thus, it is possible to make the driver feel that the highlighting image is present further nearby as the level of emergency is higher.

The controller 20 may cause a default highlighting image to be inclined with respect to the vertical direction in the actual view, and may cause the default highlighting image to be displayed so as to be inclined along the inclination of a straight line connecting a vanishing point in the actual view to the specific object. The positional information regarding the vanishing point on the actual view is set based on the position and imaging direction of an imaging camera, and is stored in advance in the display control device 10. The controller 20 calculates a reference position of the specific object, such as a center position of the specific object, from the specific object displayed in a captured image, calculates a straight line connecting the reference position of the specific object to the position of the vanishing point, and causes the highlighting image to be inclined along the inclination of the straight line. Thus, the highlighting image is provided with an appearance of depth. Thus, it is possible to enable the driver to easily gain a sense of distance from the specific object.

Figure 4:
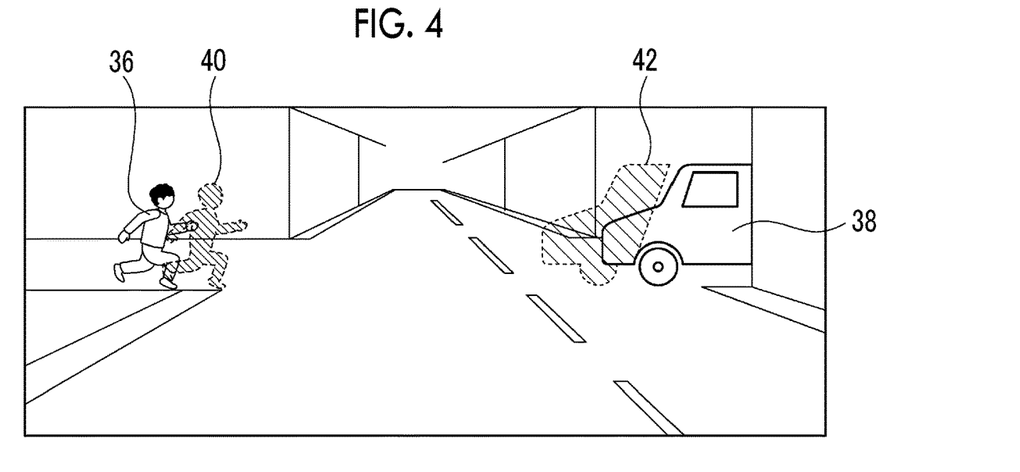
FIG. 4 is a diagram illustrating the actual view ahead of the host vehicle, which is visually recognized by the driver, and highlighting images that are displayed so as to be superimposed on the actual view and that respectively correspond to traveling directions of specific objects.

FIG. 4 is a diagram illustrating the actual view ahead of the host vehicle, which is visually recognized by the driver, and highlighting images that are displayed so as to be superimposed on the actual view and that correspond to traveling directions of specific objects. A fifth highlighting image 40 has a shape of a person corresponding to a pedestrian 36, and a sixth highlighting image 42 has a partial shape of a vehicle corresponding to a vehicle 38. Each of the fifth highlighting image 40 and the sixth highlighting image 42 has a shape simulating the shape of a corresponding one of the specific objects.

The detection unit 18 detects a fact that the pedestrian 36 is traveling rightward and the vehicle 38 is traveling leftward, based on a result of detection by the vehicular sensor 12. The controller 20 causes the fifth highlighting image 40 to be displayed at a position shifted from the pedestrian 36 in the traveling direction of the pedestrian 36. The controller 20 causes the sixth highlighting image 42 to be displayed at a position shifted from the vehicle 38 in the traveling direction of the vehicle 38. That is, the controller 20 executes control of displaying a highlighting image at a position shifted from a specific object in the traveling direction of the specific object. Note that, the fifth highlighting image 40 and the sixth highlighting image 42 are partially superimposed on the specific objects, whereby the driver can recognize the specific objects with almost no need to shift the driver's gaze.

The highlighting image is displayed so as to be shifted from the specific object. Thus, it is possible to restrain the virtual image (highlighting image) from being formed on the actual image (specific object), thereby restraining the highlighting image from becoming less conspicuous. The highlighting image is displayed at a position shifted from the specific object in the traveling direction of the specific object. Thus, the driver easily recognizes the traveling direction of the specific object.

The controller 20 may cause the highlighting image to be displayed so as to be shifted from the specific object along a straight line connecting the reference position of the specific object to the position of the vanishing point. The controller 20 may vary an amount by which the highlighting image is shifted from the specific object, depending on the level of emergency. The controller 20 causes the highlighting image to be displayed so as to be superimposed on the specific object or to be displayed in the vicinity of the specific object, and causes the highlighting image to be shifted from the specific object along the straight line extending toward the vanishing point. In this way, the highlighting image is provided with an appearance of depth. Thus, it is possible to enable the driver to easily gain a sense of distance from the specific object.

The controller 20 may set a shift amount by which the highlighting image is shifted from the specific object, based on a speed of the specific object. The speed of the specific object, which is used to set the shift amount, is a speed in the right-left direction of the host vehicle, and may be a relative speed between the host vehicle and the specific object, and is calculated based on a result of detection by the vehicular sensor 12. The controller 20 sets the shift amount to be greater as the speed of the specific object is higher. That is, controller 20 sets the shift amount to be greater when the speed of the specific object is relatively high than when the speed of the specific object is relatively low. Thus, it is possible to enable the driver to predict a movement of the specific object based on the positional relationship between the specific object and the highlighting image.

The controller 20 may cause the highlighting image to be displayed at a position shifted from the specific object in the traveling direction of the specific object when the specific object is approaching the center line extending in the traveling direction of the host vehicle. On the other hand, the controller 20 may cause the highlighting image to be displayed such that the highlighting image coincides with the specific object, that is, may cause the highlighting image to be displayed such that the highlighting image is not shifted from the specific object, when the specific object is not approaching the center line extending in the traveling direction of the host vehicle. When the specific object is approaching the center line extending in the traveling direction of the host vehicle, the controller 20 may cause the highlighting image to be displayed such that the shift amount is greater than that when the specific object is not approaching the center line extending in the traveling direction of the host vehicle. Thus, the driver is informed of whether the specific object is approaching the center line extending in the traveling direction of the host vehicle, based on the shift amount.

The controller 20 may set highlighting images in different colors corresponding to the kinds of specific objects. For example, highlighting images having different colors, that is, different pixel values, are set for respective kinds of specific objects, such as a pedestrian, a bicycle, and an automobile. Thus, the driver can recognize the kind of a specific object by recognizing the color of the highlighting image.

While the embodiment of the disclosure has been described above, the foregoing embodiment is intended to be just illustrative. It is obvious to persons skilled in the art that various modifications may be made to combinations of constituent elements or processes and that such modifications are within the scope of the disclosure.

What is claimed is:

1. A display control device configured to control a head-up display that projects an image onto an area ahead of a driver to display the image such that the image that is a virtual image is superimposed on an actual view, the display control device comprising a controller configured to execute control such that a highlighting image that highlights a specific object present ahead of a vehicle is displayed when a warning against the specific object is given to the driver, the specific object being detected based on traveling situation information regarding a traveling situation of the vehicle, and the traveling situation information being based on an output from a vehicular sensor including an on-board camera;

wherein the highlighting image is displayed in a vicinity of the specific object at a position shifted from the specific object in a traveling direction of the specific object, the highlighting image having a shape corresponding to the specific object;

wherein the controller is configured to determine a speed of the specific object; and wherein an amount that the position of the highlighting image is shifted from the specific object is based on the speed of the specific object.

2. The display control device according to claim 1, wherein the controller is configured to derive a level of emergency based on the traveling situation information and to vary the highlighting image depending on the level of emergency.

3. The display control device according to claim 2, wherein the controller is configured to execute control such that the highlighting image that makes the specific object more conspicuous is displayed as the level of emergency is higher.

4. The display control device according to claim 1, wherein the controller is configured to execute control such that the highlighting image is displayed only when an emergent situation for traveling of the vehicle has occurred.

5. A display control method of controlling a head-up display that projects an image onto an area ahead of a driver to display the image such that the image that is a virtual image is superimposed on an actual view, the display control method comprising:

acquiring traveling situation information regarding a traveling situation of a vehicle based on an output from a vehicular sensor including an on-board camera;

displaying a highlighting image which highlights a specific object that is present ahead of the vehicle and that is detected based on the traveling situation information, when a warning against the specific object is given to the driver, the highlighting image is displayed in a vicinity of the specific object at a position shifted from the specific object in a traveling direction of the specific object, the highlighting image having a shape corresponding to the specific object;

determining a speed of the specific object; and shifting the position of the highlighting image from the specific object based on the speed of the specific object.

6. The display control device according to claim 1, wherein the controller is configured to derive a level of emergency based on the traveling situation information; and wherein an amount that the position of the highlighting image is shifted from the specific object is based on the level of emergency.

7. The display control method according to claim 5, further comprising deriving a level of emergency based on the traveling situation information; and shifting the position of the highlighting image from the specific object based on the level of emergency.

* * * * *

UNITED STATES PATENT AND TRADEMARK OFFICE
CERTIFICATE OF CORRECTION

PATENT NO. : 10,866,416 B2
APPLICATION NO. : 16/221805
DATED : December 15, 2020
INVENTOR(S) : Rie Murai It is certified that error appears in the above-identified patent and that said Letters Patent is hereby corrected as shown below:

On the Title Page

Item (71), Applicant 1, city, delete "Toyota" and insert --Toyota-shi Aichi-ken--, therefor.

Item (72), inventor 1, city, delete "Chiba" and insert --Chiba-shi Chiba-ken--, therefor.

Item (73), assignee, city, delete "Toyota" and insert --Toyota-shi Aichi-ken--, therefor.

Item (57), Line(s) 11, after "information", insert --is--, therefor.

In the Specification

In Column 2, Line(s) 19, delete "trial" and insert --virtual--, therefor.

In Column 2, Line(s) 29, after "occurred", insert --,--.

In Column 2, Line(s) 53, delete "FIG. 1B" and insert --FIG. 3B--, therefor.

In Column 3, Line(s) 4, before "14", insert --HUD--.

In Column 6, Line(s) 15, delete "framer" and insert --frame for--, therefor.

In Column 6, Line(s) 16, after "highlighting", delete ",".

In Column 7, Line(s) 40, before "present", insert --specific object is--.

In Column 7, Line(s) 43, delete "FIG. 38" and insert --FIG. 3B--, therefor.

In Column 7, Line(s) 44, after "image", delete "m" and insert --to--, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,866,416 B2

In Column 7, Line(s) 56, delete "rind" and insert --and--, therefor.

In Column 8, Line(s) 1, after "image", delete "id" and insert --to--, therefor.

In Column 9, Line(s) 33, after "object", insert --,--.